July 7, 1936.   I. SUNDSTROM   2,046,706
EYEGLASS CONSTRUCTION
Filed Oct. 13, 1933
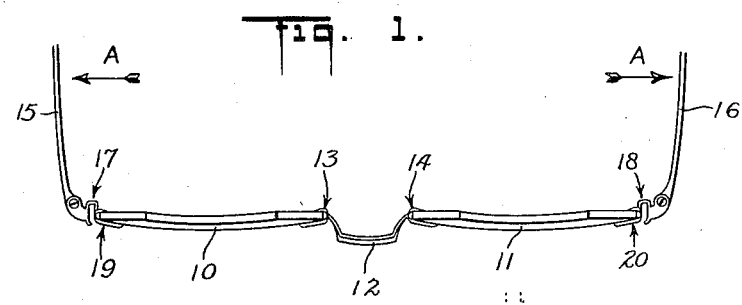
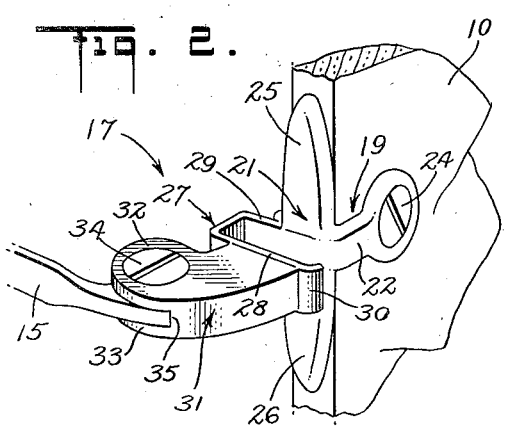
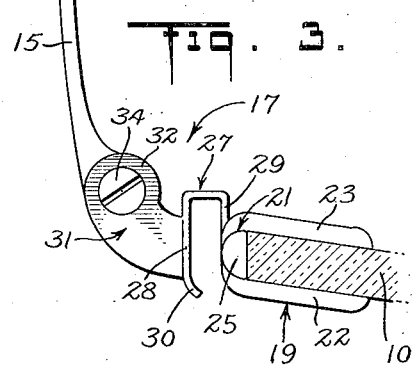
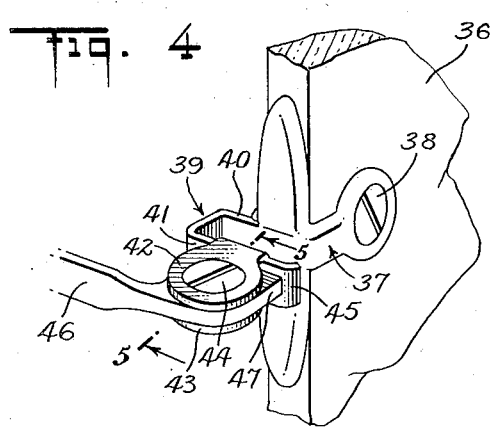
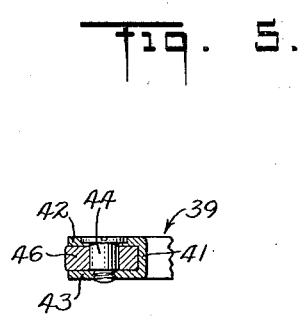
INVENTOR
*Ivar Sundstrom*
BY
his ATTORNEYS Patented July 7, 1936

2,046,706

UNITED STATES PATENT OFFICE 2,046,706

EYEGLASS CONSTRUCTION

Ivar Sundstrom, Attleboro, Mass., assignor to Bay State Optical Company, Attleboro, Mass., a corporation of Maine Application October 13, 1933, Serial No. 693,417

3 Claims. (Cl. 88—53)

This invention relates to an eyeglass construction.

One of the objects of this invention is to provide an eyeglass construction of economical manufacture and of ready assembly while requiring a minimum amount of labor. Another object is to provide a construction of the above character which is light, comfortable in use, and of pleasing appearance. Another object is to provide a simple construction of the above character which is graceful in appearance and yet of great strength and durability. Another object is to provide a construction of the above character in which the various strains and forces normally imparted to the lenses are absorbed and negatived before they damage the lens. Other objects will be in part obvious and in part pointed out hereinafter.

The invention accordingly consists in the features of construction, combinations of elements and arrangements of parts as will be exemplified in the structure to be hereinafter described, and the scope of the application of which will be indicated in the following claims.

In the accompanying drawing, in which are shown several of the various possible embodiments of this invention, Figure 1 is a fragmentary top plan view of an eyeglass frame;

Figure 2 is a fragmentary perspective view of that portion of the frame shown in Figure 1 in the vicinity of the endpiece;

Figure 3 is a top plan view of the parts shown in Figure 2;

Figure 4 is a fragmentary perspective view of another embodiment of my invention, and Figure 5 is a sectional view in elevation, taken along the line 5—5 of Figure 4.

Similar reference characters refer to similar parts throughout the several views of the drawing.

As conducive to a clearer understanding of certain features of this invention, it might here be pointed out that eyeglass frames and, more particularly, frames of the "rimless" type are notoriously fragile in character and subject to easy breakage. Such damage is often the result of certain strains and forces exerted by the several parts which are attached to the lenses. For example, the very small area in the vicinity of the edge of the lens and the lens strap must support practically all the strains imparted thereto, as, for example, by the tendency of the wearer to spread the temples when putting the frame on. Not only is this area quite limited but it is also further weakened by a hole or the like which extends through the lens to accommodate a pin for securing the lens strap to the lens. Thus it becomes clear that a very slight strain may fracture the lens, causing the wearer considerable inconvenience and expense. Notable among the many forces causing strains to which the lens edge is subject, are those forces resulting when the temples are unfolded into their open position as mentioned above. The natural leverage generated will tend to force the endpieces forwardly of the lens and exert bending strains on the lens area immediately adjacent the lens strap. Also, when the temples have been placed in open position, it very frequently occurs that the temples are sprung outwardly still farther causing the temples to bow and exert considerably more leverage on the endpieces than that ensuing when they are being pivoted. Part of the strain engendered by this increased leverage is absorbed by the resiliency of the temples themselves, but the major portion of it is transferred to the fragile lens edge increasing materially the risk of breakage or serious impairment of the lens. It follows that the farther the spring points of the temples, i. e., the part of the temples least resistant to bending, are removed from those areas, the greater will be the leverage and the ensuing strains. In addition to the above difficulties, the further difficulty prevails in common constructions of excessive rigidity and resultant resistance against various adjustments which must be made when fitting the frame to the wearer. One of these adjustments termed "angling" is necessary in order that the angle of the lenses will conform to the head contours of the wearer, and, further, to provide the proper lens angle for perfect vision in accordance with the corrections incorporated in the lenses. One of the objects of this invention is to provide a construction in which these difficulties in addition to many others are effectively overcome in a practical manner.

Referring now to Figure 1, there is shown an eyeglass frame having a pair of lenses 10 and 11 connected by a bridge 12 secured to the lenses by suitable fittings generally indicated at 13 and 14.

A pair of temples are preferably connected to fittings generally indicated at 17 and 18 by saddles generally indicated at 19 and 20, fittings 17 and 18 and saddles 19 and 20 being substantially similar in construction. Consequently a detailed description of fitting 17 and saddle 19 will suffice for their counterparts, fitting 18 and saddle 20.

As more clearly shown in Figures 2 and 3, saddle 19 comprises a strap generally indicated at 21 in engagement with the edge of lens 10 and a pair of arms 22 and 23 extending over opposite surfaces thereof. Preferably a pin member 24 extends through arm 22 and lens 10 and is threaded into arm 23. Thus saddle 19 is secured to lens 10 and is prevented from pivoting thereon about pin 24 by portions 25 and 26 engaging the edge of lens 10.

Firmly secured to strap 21, as for example, by soldering or the like, is a substantially U-shaped resilient member generally indicated at 27 which preferably extends therefrom rearwardly of lens 10, as viewed in Figure 2. A projection 28 of resilient member 27 extends substantially in juxtaposition with the other projection 29 of resilient member 27, projection 29 being that portion of member 27 secured to strap 21. The forward end portion 30 of projection 28 is bent inwardly toward strap 21 to limit the compression of member 27, e. g., the movement of projection 28 toward strap 21. By thus limiting the compression of this spring member, undue distortion of the various parts and resultant weakening is practicably and effectively avoided.

An endpiece generally indicated at 31 is secured to the projection 28 to lie substantially opposite the strap 21 and preferably in registry with lens 10. As more clearly shown in Figure 2, endpiece 31 has suitable ears 32 and 33 providing a pivotal connection for a temple 15 about a pin 34 which extends through ear 32, temple 15, and is preferably threaded into ear 33. The counter-clockwise pivotal movement of temple 15 about pin 34 is limited by a stop portion 35 of endpiece 31.

By interposing the resilient member 27 between endpiece 31 and strap 21, I achieve a resilient connection which absorbs any forces exerted on endpiece 31 rather than transmitting such forces to the fragile lens edge itself. Such forces naturally ensue during the unfolding of the temples into their open position and further forcing them outwardly after the stop 35 has been engaged. These forces are transferred directly to resilient member 27 which absorbs them rather than transmitting them, until the curve portion 30 abuts against the strap 21 or projection 29, after which the resiliency of the temple is ample to absorb any further strains.

A further advantage of this construction lies in providing a practical means for making various adjustments and, more particularly, "angling" referred to above. The angle formed by a substantially vertical plane passing through lens 10 and a substantially horizontal plane passing through temples 15 and 16 can be varied according to the circumstances encountered in fitting the wearer by slightly forcing endpiece 31 up or down according to the angle desired. This can be done without unduly distorting member 27 or impairing its usefulness nor does this angling adjustment exert any dilatory strains upon the lens itself either during or after the operation.

Referring now to Figure 4, there is shown a modification of my construction in which a lens 36 has secured thereto a saddle generally indicated at 37 substantially similar in construction to saddle 19 in Figure 2. Thus saddle 37 is secured to lens 36 by means of screw 38 extending through the lens and suitable arms forming a part of saddle 37. A substantially U-shaped resilient member generally indicated at 39 is suitably secured to saddle 37 by a projection 40 thereof which extends rearwardly therefrom. The forwardly extending projection 41 of member 39 extends in parallel relation with projection 40 and has integrally formed therewith a pair of spaced outwardly extending lugs 42 and 43, the lugs having suitable openings for receiving a threaded pin 44. Lugs 42 and 43 extend laterally at right angles and preferably substantially in juxtaposition from projection 41, which in turn extends forwardly of the lugs to form the curved portion 45. Portion 45 is curved toward saddle 37 and acts as a stop to limit the compression of member 39. A temple 46 having a suitable stop portion 47 is pivotally secured between lugs 42 and 43 by pin 44.

Thus I achieve an integral construction, the advantages of which are many. The resilient member 39 and lugs 42 and 43 can be stamped out in any suitable manner and then bent into the preferred form. Accordingly, I avoid the time-consuming labor of soldering the various parts together and further obviate forming several parts individually. Also the inherent strength and resiliency of the resilient member 39 is retained and a most durable endpiece attachment is accomplished. It will also be clear that the "angling" adjustment referred to hereinabove is quite easily and readily accomplished without endangering the fitting or the lens in any way.

Accordingly, it will now become clear that by this novel construction I have located the spring point referred to hereinabove as close to the saddles 19 or 37 as possible. I have thus reduced the lever arm materially by providing the resilient members 27 or 39 which will absorb substantially all strains ensuing from forces exerted in a direction indicated by the arrow A, as in Figure 1, on the temples. The proportion of the strain transmitted to the lens will thus be negligible and will be readily resisted thereby without danger of breakage. By providing the stops or abutments 35 and 45, I prevent undue distortion and weakening of resilient members 27 and 39 respectively without decreasing the strain-absorbing capacity of the spring members.

It will thus be seen that I have provided a thoroughly practical and efficient construction in which the several objects referred to hereinabove as well as many others are successfully and efficiently achieved.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, a lens, an end piece, a strap member substantially following a portion of the edge of said lens, a pair of arms integral with said strap member and extending in juxtaposition over the opposite surfaces of said lens, a pin member extending through said arms and said lens to secure said strap member, said arms, and said lens in related assembly, a substantially U-shaped resilient member, one projection of which is integrally related to said strap member and extends rearwardly therefrom beyond the plane of the rear surface of said lens, said end piece being secured to the other projection of said U-shaped member, the opposite sides of said end piece being substantially spaced from the extremities of said last-mentioned projection, and said end piece being juxtaposed with respect to said strap member, both projections of said U-shaped member being substantially coextensive, and the closed end of said U-shaped member lying to the rear of the plane of the rear surface of said lens, and the free end of the projection on which said end piece is mounted being bent inwardly toward the other projection to positively limit the movement of said projections toward one another, and a temple pivotally mounted on said end piece.

2. In eyeglass construction, in combination, a lens, an end piece, a strap member substantially following a portion of the edge of said lens, a pair of arms integral with said strap member lying on opposite surfaces of said lens, a pin member extending through said arms and said lens to secure said strap member, said arms, and said lens in related assembly, a substantially U-shaped resilient member having one of its projections integrally related to said strap member, said projection extending rearwardly therefrom beyond the plane of the rear surface of said lens, said end piece being secured to the other projection of said U-shaped resilient member and being juxtaposed with respect to said strap member, the closed end of said U-shaped member lying to the rear of the plane of the surface of said lens, means on one of said projections extending toward the other of said projections to positively limit the movement of said projections toward one another upon compression of said resilient member, and a temple pivotally mounted on said end piece.

3. In eyeglass construction, in combination, a lens, an end piece, a strap member substantially following a portion of the edge of said lens, a pair of arms integral with said strap member and extending in juxtaposition over the opposite surfaces of said lens, a pin member extending through said arms and said lens to secure said strap member, said arms and said lens in related assembly, a substantially U-shaped resilient member having one projection integrally related to said strap member, said end piece being mounted on the other projection of said resilient member whereby opposite sides of said end piece are spaced from the extremities of the projection on which it is mounted, means on one of said projections extending toward the other of said projections adapted to limit the compression of said resilient member, and a temple pivotally mounted on said end piece.

IVAR SUNDSTROM.